United States Patent
Tian et al.

(10) Patent No.: US 12,204,133 B2
(45) Date of Patent: Jan. 21, 2025

(54) BACKLIGHT MODULE AND DISPLAY PANEL

(71) Applicant: WUHAN CHINA STAR OPTOELECTRONICS TECHNOLOGY CO., LTD., Hubei (CN)

(72) Inventors: Dong Tian, Hubei (CN); Gege Zhou, Hubei (CN); Wei Zhou, Hubei (CN); Jianfeng Yuan, Hubei (CN); Zhifu Li, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/660,360

(22) Filed: May 10, 2024

(65) Prior Publication Data

US 2024/0288620 A1  Aug. 29, 2024

Related U.S. Application Data

(63) Continuation of application No. 17/622,477, filed as application No. PCT/CN2021/138564 on Dec. 15, 2021, now Pat. No. 11,982,829.

(30) Foreign Application Priority Data

Dec. 13, 2021 (CN) .......................... 202111514442.4

(51) Int. Cl.
*F21V 8/00* (2006.01)

(52) U.S. Cl.
CPC .................. *G02B 6/0031* (2013.01)

(58) Field of Classification Search
CPC ..................................................... G02B 6/0031
See application file for complete search history.

(56) References Cited

U.S. PATENT DOCUMENTS 5,808,708 A * 9/1998 Oyama ............... G02B 6/0018
362/621
9,075,175 B2 * 7/2015 Tsai ..................... G02B 6/0036
(Continued)

FOREIGN PATENT DOCUMENTS

| CN | 202025105 U | 11/2011 |
|----|-------------|---------|
| CN | 203298217 U | 11/2013 |
| CN | 104776363 A | 7/2015 |

(Continued)

OTHER PUBLICATIONS

Chinese Office Action issued in corresponding Chinese Patent Application No. 202111514442.4 dated Aug. 15, 2022, pp. 1-8.

(Continued)

*Primary Examiner* — Leah Simone Macchiarolo
(74) *Attorney, Agent, or Firm* — PV IP PC; Wei Te Chung

(57) ABSTRACT

A backlight module and a display panel are provided. The display panel includes a display panel main body and a backlight module. The backlight module includes a light guide, a first reflector, and a light source. By arranging the light source in a receiving cavity of the light guide, a width of a lamp socket of the backlight module is reduced, and a light effect of the lamp socket of the backlight module is improved.

20 Claims, 4 Drawing Sheets

(56) References Cited

U.S. PATENT DOCUMENTS

2010/0296268 A1* 11/2010 Fasham ................ G02B 6/0028
                                                    362/241
2012/0249921 A1* 10/2012 Yu ........................ G02B 6/0031
                                                    362/609

FOREIGN PATENT DOCUMENTS

| CN | 104964213 A | 10/2015 |
| --- | --- | --- |
| CN | 108132565 A | 6/2018 |
| CN | 108700263 A | 10/2018 |
| CN | 109683398 A | 4/2019 |
| CN | 211375118 U | 8/2020 |
| CN | 112987407 A | 6/2021 |
| CN | 113687539 A | 11/2021 |
| JP | 2008299181 A | 12/2008 |

OTHER PUBLICATIONS

Chinese Office Action issued in corresponding Chinese Patent Application No. 202111514442.4 dated Feb. 15, 2023, pp. 1-5.
Chinese Rejection Decision issued in corresponding Chinese Patent Application No. 202111514442.4 dated Jun. 29, 2023, pp. 1-6.
International Search Report in International application No. PCT/CN2021/138564, mailed on Aug. 25, 2022.
Written Opinion of the International Search Authority in International application No. PCT/CN2021/138564, mailed on Aug. 25, 2022.

* cited by examiner

BACKLIGHT MODULE AND DISPLAY PANEL

CROSS-REFERENCE TO RELATED APPLICATIONS

This application is a continuation application of U.S. application Ser. No. 17/622,477, filed on Dec. 23, 2021, which is a National Phase of PCT Patent Application No. PCT/CN2021/138564 having international filling date of Dec. 15, 2021, which claims the priority of Chinese Application No. 202111514442.4 filed with the Chinese Patent Office on Dec. 13, 2021 and titled "BACKLIGHT MODULE AND DISPLAY PANEL", which is incorporated herein by reference in its entirety.

FIELD OF INVENTION

The present application relates to the field of display technologies, and more particularly to a backlight module and a display panel.

BACKGROUND OF INVENTION

Due to advantages of low working voltage, low power consumption, flexible display mode, and low radiation, liquid crystal display (LCD) technology is widely used in various fields, such as computers, mobile phones, televisions, and measurement displays. The LCD panel usually includes a liquid crystal display panel main body and a backlight module. A main body of the liquid crystal display panel includes an array substrate, a color filter substrate, and a liquid crystal layer sandwiched between the two substrates. The backlight module is used to provide the main body of the liquid crystal display panel with light required for displaying images.

Technical Problem

As shown in FIG. 1, FIG. 1 is a schematic diagram of a structure of a lamp socket of an existing backlight module. The backlight module usually includes a frame 11, a flexible circuit board 12, a light source 13, a light guide plate 14, a reflective sheet 15, an optical film 16, and a light shielding glue 17. A width D of the lamp socket of the backlight module is mainly composed of three parts: a distance A between the frame 11 and the light source 13, a width B of the light source 13, and an optical path C of the light source 13. The optical path C is a light mixing distance of the backlight module. That is, a distance between a light exiting surface of the light source 13 and an effective display area of the display panel. This directly affects a light effect of the lamp socket. The larger the value of C, the better the light effect of the lamp socket. Due to a limitation of a structural size of the light source 13, the current distance A between the frame 11 and the light source 13 and the width B of the light source 13 cannot be further compressed. As a result, a width D of the 1 lamp socket of the backlight module cannot be further compressed.

In summary, the existing backlight module has the problem of a large width of the lamp socket. Therefore, it is necessary to provide a backlight module and a display panel to improve this defect.

SUMMARY OF INVENTION

Embodiments of the present application provide a backlight module and a display panel, which are used to solve the problem of large lamp socket width in an existing backlight module.

An embodiment of the present application provides a backlight module comprising:
  a light guide having a receiving cavity;
  a first reflector disposed on a side of the light guide, wherein a reflective surface of the first reflector faces the light guide; and
  a light source disposed in the receiving cavity, wherein a light emitting surface of the light source faces the reflective surface of the first reflector.

According to an embodiment of the present application, the light guide has a main body and a protruding portion disposed below the main body, and the main body and the protruding portion are enclosed to form the receiving cavity.

According to an embodiment of the present application, the main body comprises a light exiting surface and a first surface that are opposed to each other, the protruding portion and the light source are both disposed on a side of the first surface away from the light exiting surface, and the light source is disposed on a side of the protruding portion away from the first reflector.

According to an embodiment of the present application, the main body comprises an inclined first side surface, and the protruding portion comprises an inclined second side surface;
  wherein an included angle between the first side surface and the second side surface is greater than or equal to 30 degrees and less than or equal to 180 degrees.

According to an embodiment of the present application, the first reflector comprises a first part parallel to the first side surface and a second part parallel to the second side surface.

According to an embodiment of the present application, opposite ends of the first side surface are directly connected to the light exiting surface and the second side surface.

According to an embodiment of the present application, the main body and the protruding portion are integrally formed.

According to an embodiment of the present application, the light exiting surface comprises a first light exiting surface and a second light exiting surface that are on a same plane, and the main body comprises:
  a first sub-body comprising the first light exiting surface and a first surface opposite to the first light exiting surface; and
  a second sub-body located on a side of the first sub-body close to the first reflector, wherein the second sub-body has the second light exiting surface, the first side surface, and a second surface that is opposite to the first side surface and faces the first sub-body, opposite ends of the second light exiting surface are directly connected to the first side surface and the second surface, and the protruding portion is located below the second sub-body and is integrally formed with the second sub-body.

According to an embodiment of the present application, opposite ends of the first side surface are directly connected to the light exiting surface and the first surface, and the protruding portion is fixedly connected to the first surface.

According to an embodiment of the present application, the backlight module further comprises a frame, the light guide and the light source are both disposed in the frame, and the first reflector is disposed on a side of the light guide close to the frame.

According to an embodiment of the present application, a side frame of the frame close to the protruding portion protrudes outward to form a wedge-shaped structure adapted to the first side surface and the second side surface, and an end of the main body close to the side frame and the protruding portion at least partially extend into the wedge-shaped structure.

According to an embodiment of the present application, the light guide further comprises a second reflector, and the second reflector is disposed between the light source and the first surface.

An embodiment of the present application further provides a display panel, wherein the display panel comprises a display panel main body and a backlight module, the display panel main body is disposed on a light exiting side of the backlight module, and the backlight module comprises:
- a light guide having a receiving cavity;
- a first reflector disposed on a side of the light guide, wherein a reflective surface of the first reflector faces the light guide; and
- a light source disposed in the receiving cavity, wherein a light emitting surface of the light source faces the reflective surface of the first reflector.

According to an embodiment of the present application, the light guide has a main body and a protruding portion disposed below the main body, and the main body and the protruding portion are enclosed to form the receiving cavity.

According to an embodiment of the present application, the main body comprises a light exiting surface and a first surface that are opposed to each other, the protruding portion and the light source are both disposed on a side of the first surface away from the light exiting surface, and the light source is disposed on a side of the protruding portion away from the first reflector.

According to an embodiment of the present application, the main body comprises an inclined first side surface, and the protruding portion comprises an inclined second side surface;
  wherein an included angle between the first side surface and the second side surface is greater than or equal to 30 degrees and less than or equal to 180 degrees.

According to an embodiment of the present application, the first reflector comprises a first part parallel to the first side surface and a second part parallel to the second side surface.

According to an embodiment of the present application, opposite ends of the first side surface are directly connected to the light exiting surface and the second side surface.

According to an embodiment of the present application, the main body and the protruding portion are integrally formed.

According to an embodiment of the present application, the light exiting surface comprises a first light exiting surface and a second light exiting surface that are on a same plane, and the main body comprises:
- a first sub-body comprising the first light exiting surface and a first surface opposite to the first light exiting surface; and
- a second sub-body located on a side of the first sub-body close to the first reflector, wherein the second sub-body has the second light exiting surface, the first side surface, and a second surface that is opposite to the first side surface and faces the first sub-body, opposite ends of the second light exiting surface are directly connected to the first side surface and the second surface, and the protruding portion is located below the second sub-body and is integrally formed with the second sub-body.

Beneficial Effect

The beneficial effects of the embodiments of the present disclosure: the embodiments of the present application provide a backlight module and a display panel. The display panel includes a display panel main body and a backlight module. The backlight module includes a light guide, a first reflector, and a light source. The first reflector is arranged on a side of the light guide. A reflective surface of the first reflector faces the light guide. By arranging the light source in a receiving cavity of the light guide, a light exiting surface of the light source faces the reflective surface of the first reflector. After the light emitted by the light source emerges from the light guide, it can be reflected back into the light guide through the reflective surface of the first reflector. This makes a mixing distance of the backlight module unaffected. Therefore, while reducing a width of the lamp socket of the backlight module, the lamp socket of the backlight module can have a good light effect.

DESCRIPTION OF DRAWINGS

In order to explain the embodiments or the technical solutions in the prior art more clearly, the following will briefly introduce the drawings that need to be used in the description of the embodiments or the prior art. Obviously, the drawings in the following description are only some of the disclosed embodiments. For those of ordinary skill in the art, other drawings can be obtained based on these drawings without creative work.

DETAILED DESCRIPTION OF PREFERRED EMBODIMENTS

Figure 1:
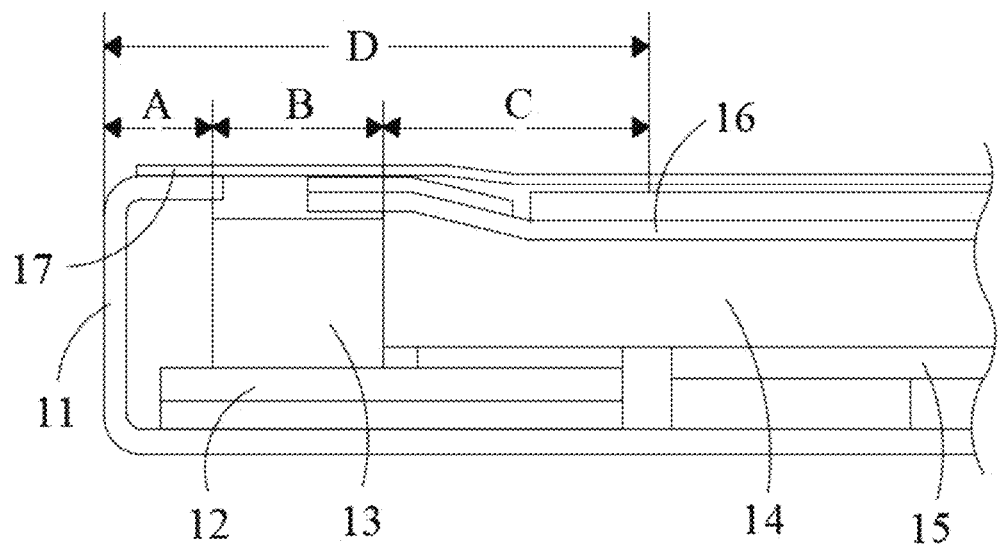
FIG. 1 is a schematic diagram of a structure of a lamp socket of an existing backlight module.

The description of the following embodiments refers to the attached drawings to illustrate specific embodiments that the present disclosure can be implemented. The directional terms mentioned in this disclosure, such as "upper", "lower", "front", "rear", "left", "right", "inner", "outer", "side", etc., are only the direction of referring to the attached drawings. Therefore, the directional terms used are used to illustrate and understand the present disclosure, rather than to limit the present disclosure. In the figure, units with similar structures are indicated by the same reference numerals.

The disclosure will be further described below in conjunction with the drawings and specific embodiments:

The embodiments of the application provide a backlight module, a display panel, and an electronic device. The electronic device includes the display panel. In the embodiment of the present application, the electronic device may be a mobile terminal, such as a smart phone, a tablet computer, a notebook computer, and so on. The electronic device may also be a wearable terminal, such as a smart watch, a smart bracelet, smart glasses, an augmented reality device, and so on. The electronic device can also be a fixed terminal, such as a desktop computer, a TV, and so on.

Figure 2:
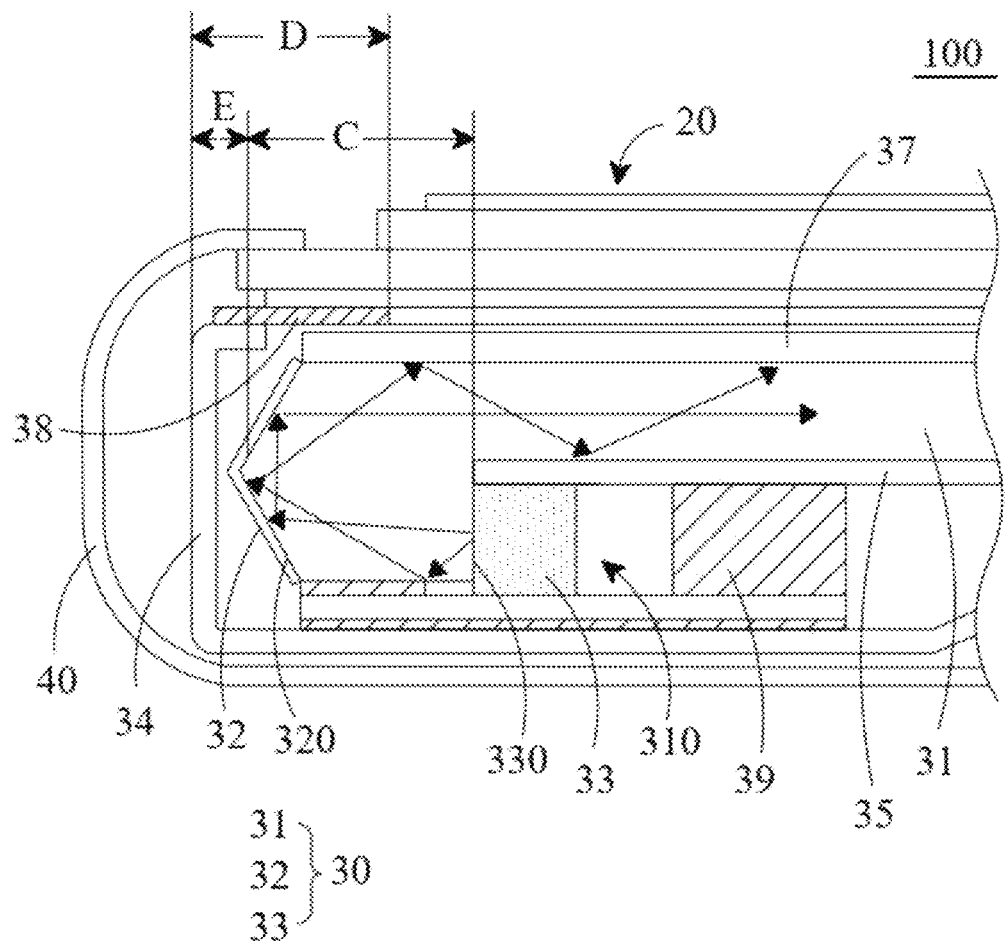
FIG. 2 is a schematic diagram of a partial structure of a display panel provided by an embodiment of the application.

As shown in FIG. 2, FIG. 2 is a schematic diagram of a partial structure of a display panel provided by an embodiment of the application. The display panel 100 includes a display panel main body 20 and a backlight module 30. The display panel main body 20 is a liquid crystal display panel. The display panel main body 20 is disposed on a light exiting side of the backlight module 30. The display panel main body 20 can be bonded to the backlight module 30 by optical glue.

The display panel 100 also includes a flexible printed circuit board 40. One end of the flexible printed circuit board 40 is connected to the display panel main body 20. The other end of the flexible printed circuit board 40 may be configured to bypass the sides of the backlight module 30 and extend to a bottom of the backlight module 30.

Furthermore, the backlight module 30 includes a light guide 31, a first reflector 32 and a light source 33. The first reflector 32 is disposed on a side of the light guide 31. A reflective surface 320 of the first reflector 32 faces the light guide 31. The light guide 31 has a receiving cavity 310. The light source 33 is arranged in the receiving cavity 310. A light emitting surface 330 of the light source 33 faces the reflective surface 320 of the first reflector 32.

In the embodiment of the present application, the light guide 31 may be a light guide plate. The light source 33 may be a point light source or a surface light source. The light source 33 may be disposed at the bottom of at least one end of the light guide 31. The light source 33 may include one or more light emitting diodes (LEDs). In practical applications, the type of light source 33 is not limited to the above-mentioned light emitting diodes, and may also include mini light emitting diodes (mini LEDs) or micro light emitting diodes (micro LEDs).

As shown in FIG. 2, arrow in FIG. 2 shows the propagation direction of the light emitted by the light source 33. The light source 33 is disposed in the receiving cavity 310 at the bottom of the light guide 31. The light emitting surface 330 of the light source 33 faces the reflective surface 320 of the first reflector 32. The light emitted from the light emitting surface 330 of the light source 33 enters the light guide 31, and then reaches the side of the light guide 31 close to the first reflector 32, and is reflected by the reflective surface 320 of the first reflector 32, and then re-injects into the light guide 31 and is transmitted from a near light source end of the light guide 31 to a far light source end of the light guide 31.

Because the light source 33 is arranged in the receiving cavity 310 at the bottom of the light guide 31, the light emitted by the light source 33 can be reflected by the first reflector 32 to the light guide 31 above the light source 33. This enables the light guide 31 located above the light source 33 to also have the ability to diffuse light, and the presence of the light source 33 does not affect a width D of the lamp socket of the backlight module 30. Therefore, the width D of the lamp socket of the backlight module 30 only includes an optical path C and a distance E between a frame and the light guide 31.

Compared with the existing backlight module shown in FIG. 1, the minimum width of the lamp socket is still greater than 1.8 mm. The width D of the lamp socket of the backlight module 30 provided by the embodiment of the present application is smaller, and the minimum value of the width D of the lamp socket may be less than 1 mm. In addition, the light guide 31 and the first reflector 32 extend a light mixing distance of the light source 33. As a result, the optical path C of the light source 33 will not be reduced because the light source 33 is arranged at the bottom of the light guide 31, so that the backlight module 30 has a good light effect at the lamp socket.

Further, the light guide 31 has a main body 311 and a protruding portion 312 disposed below the main body 311. The protruding portion 312 is formed extending from a bottom of the main body 311 along a thickness direction of the main body portion 311. The main body portion 311 and the protruding portion 312 enclose the receiving cavity 310.

Figure 3:
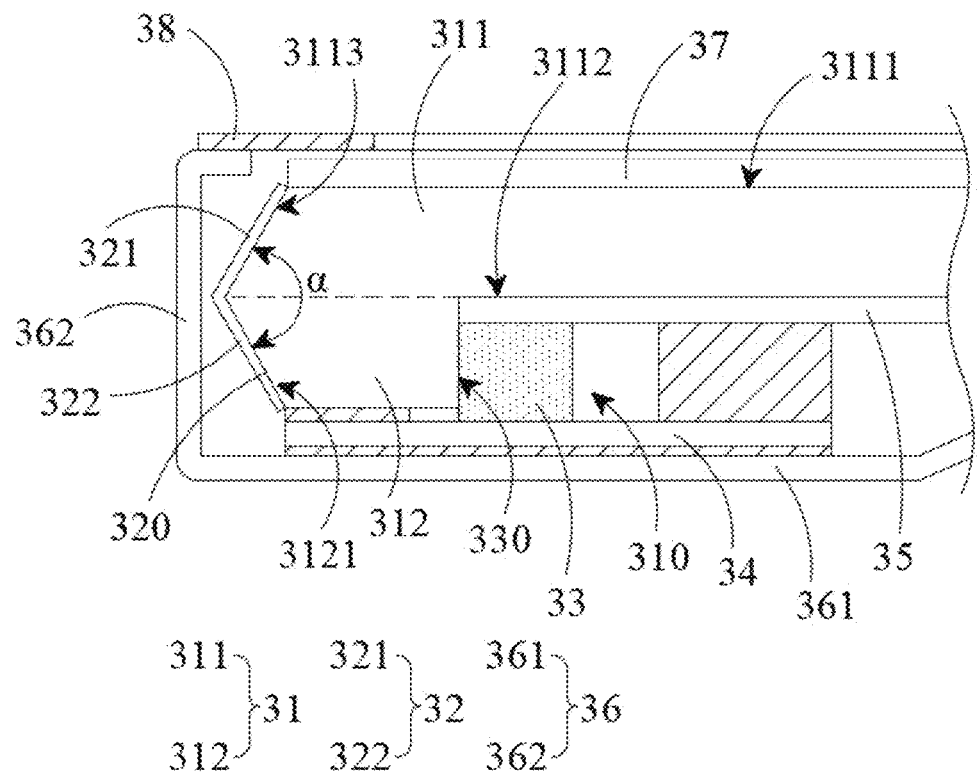
FIG. 3 is a schematic structural diagram of a first backlight module provided by an embodiment of the application.

In an embodiment, as shown in FIG. 3, FIG. 3 is a schematic structural diagram of the first backlight module provided by an embodiment of the application. A dotted line in a horizontal direction divides the light guide 31 into a main body 311 and a protruding portion 312. The protruding portion 312 is connected to the bottom of the main body 311.

The main body 311 includes a light exiting surface 3111 and a first surface 3112 that are arranged opposite to each other. The protruding portion 312 and the light source 33 are both disposed on a side of the first surface 3112 away from the light exiting surface 3111. The light source 33 is disposed on a side of the protruding portion 312 away from the first reflector 32.

As shown in FIG. 3, the first surface 3112 of the main body 311 and the protruding portion 312 surround the side facing the light source 33 to form the receiving cavity 310. The light source 33 may be arranged in the receiving cavity 310. One side surface of the protruding portion 312 facing the light emitting surface 330 of the light source 33 is a light incident surface of the light guide 31. The light emitted from the light emitting surface 330 of the light source 33 enters the light guide 31 through the protruding portion 312.

Furthermore, the main body 311 has a first side surface 3113 on a side facing the first reflector 32. The protruding portion 312 has a second side surface 3121 on the side facing the first reflector 32. An included angle α is formed between the first side surface 3113 and the second side surface 3121. The included angle α is greater than or equal to 30 degrees and less than or equal to 180 degrees.

In one of the embodiments, as shown in FIG. 3, opposite ends of the first side surface 3113 are directly connected to the light exiting surface 3111 and the second side surface 3121 of the main body 311. The second side surface 3121 is also connected to the bottom surface of the protruding portion 312. The first reflector 32 is disposed on the first side surface 3113 and the second side surface 3121. In this way, the light can be reflected back into the light guide 31 through the first side surface 3113 and the second side surface 3121.

In the embodiment of the present application, the included angle α between the first side surface 3113 and the second side surface 3121 is 120 degrees. In this way, the light incident from the protruding portion 312 can be reflected into the main body 311. In this way, the light effect of the backlight module 30 at the lamp socket is improved. In practical applications, the angle α between the first side 3113 and the second side 3121 is not limited to 120 degrees, but can also be 30 degrees, 50 degrees, 60 degrees, 80 degrees, 100 degrees, 140 degrees, 160 degrees, or 180 degrees, etc., only need to be greater than or equal to 30 degrees and less than or equal to 180 degrees.

Further, the first reflector 32 includes a first part 321 and a second part 322. The first part 321 is arranged parallel to the first side surface 3113. The second part 322 is arranged parallel to the second side surface 3121. The first part 321 and the second part 322 of the first reflector 32 can form the same angle as the included angle α. This enables the light irradiated to the first side surface 3113 or the second side surface 3121 to be reflected back into the light guide 31.

In the embodiment of the present application, the first part 321 and the second part 322 of the first reflector 32 may be an integral structure or a segmented structure. The first reflector 32 may be a reflective coating formed on the first side surface 3113 and the second side surface 3121 directly by spraying or evaporation. The first reflector 32 may also be made of metal or non-metal material and attached to a reflector sheet or a reflector plate on the first side surface 3113 and the second side surface 3121 through optical glue.

In the backlight module shown in FIG. 3, part of the light emitted by the light source 33 can be incident into the protruding portion 312 through the light incident surface on the protruding portion 312. The light is reflected into the main body 311 by the first reflector 32 disposed on the side of the protruding portion 312 facing away from the light source 33. Another part of the light emitted by the light source 33 may enter the protruding portion 312 through the light incident surface of the protruding portion 312 and irradiate the flexible circuit board 34 at the bottom of the protruding portion 312. The surface of the flexible circuit board 34 close to the light guide 31 may be provided with a reflective coating. The reflective coating can reflect the light irradiated on the surface of the flexible circuit board 34 back into the protruding portion 312. The first reflector 32 located on the side of the protruding portion 312 then reflects this part of the light into the main body 311.

In an embodiment, the reflective coating on the surface of the flexible circuit board 34 may be white ink. In this way, the white ink does not absorb light and has a better ability to reflect light, so that the light irradiated to the bottom of the protruding portion 312 is reflected back into the light guide 31. In this way, the light utilization rate of the backlight module 30 is improved.

The backlight module 30 further includes a second reflector 35. The second reflector 35 is disposed at the bottom of the main body 311 and located between the first surface of the main body 311 and the light source. The second reflector 35 is used to reflect the light irradiated to the bottom surface of the main body 311 back to the main body 311. This enables the light to continue to propagate in the main body 311 of the light guide 31, thereby improving the light utilization rate of the backlight module 30.

In the embodiment of the present application, the second reflector 35 may be a reflective sheet or a reflective plate made of a metal material. The second reflector 35 may be directly attached to the first surface 3112 of the main body 311 through optical glue. In practical applications, the second reflector 35 is not limited to a reflector made of metallic materials or non-metallic materials. The second reflector 35 can also be a reflective coating formed of a reflective metal or non-metal material. The reflective coating can be directly sprayed or evaporated on the first surface 3112 of the first light guide 311.

In the embodiment of the present application, the main body 311 and the protruding portion 312 of the light guide 31 may be integrally formed by an injection molding process. In this way, the loss of light quantity in the process of light entering the main body 311 from the protruding portion 312 can be reduced, and thus the light utilization rate of the backlight module 30 can be improved.

Figure 4:
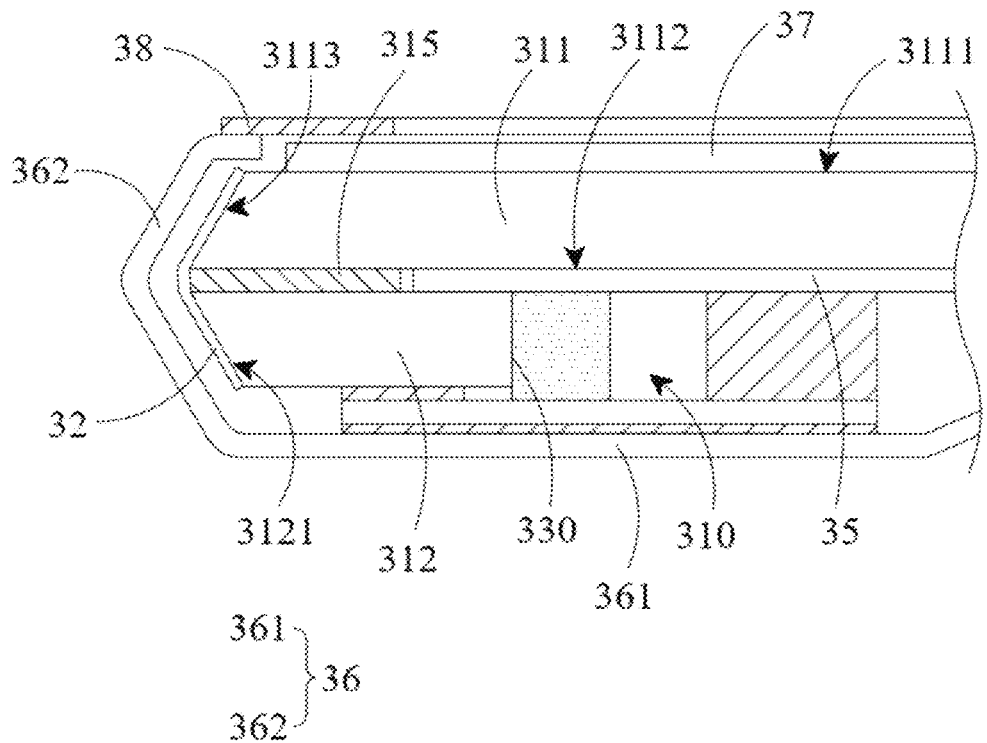
FIG. 4 is a schematic structural diagram of a second backlight module provided by an embodiment of the application.

In an embodiment, as shown in FIG. 4, FIG. 4 is a schematic structural diagram of a second backlight module provided by an embodiment of the application. The main body 311 and the protruding portion 312 are two independent components. The opposite end of the first side surface 3113 of the main body 311 is directly connected to the light exiting surface 3111 and the first surface 3112 of the main body 311. The protruding portion 312 is fixedly connected to the first surface 3112 of the main body 311.

Specifically, the protruding portion 312 may be attached to the bottom surface of the main body 311 through a high-permeability fixing glue 315. The refractive index of the high-transmittance fixing glue 315 is equal to or similar to a refractive index of the main body 311 and the protruding portion 312. The light transmittance of the high-transmittance fixing glue 315 is greater than or equal to 98%. In this way, the loss of light quantity in the process of entering the main body 311 from the protruding portion 312 can be reduced.

Figure 5:
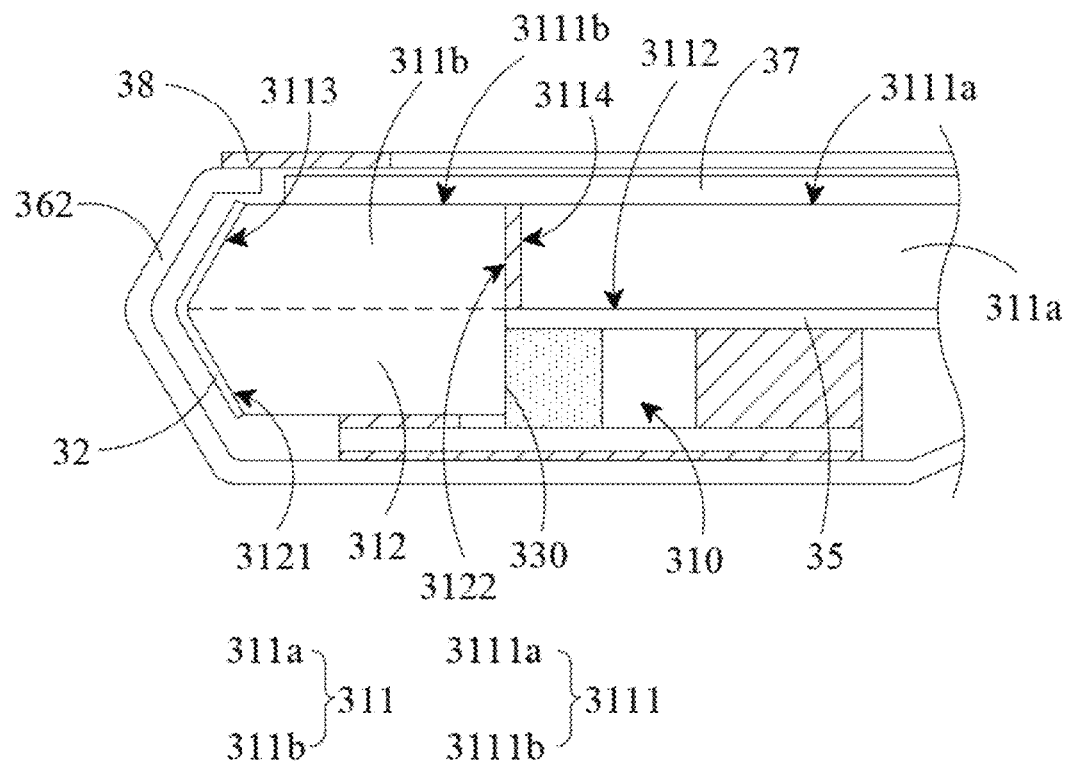
FIG. 5 is a schematic structural diagram of a third backlight module provided by an embodiment of the application.

In one embodiment, as shown in FIG. 5, FIG. 5 is a schematic structural diagram of a third backlight module provided by an embodiment of the application. The light exiting surface 3111 of the main body 311 includes a first light exiting surface 3111a and a second light exiting surface 3111b that are on the same plane. The main body 311 has a first sub-body 311a and a second sub-body 311b. The first sub-body 311a and the second sub-body 311b are two independent light guides. The first sub-body 311a has the first light exiting surface 3111a, the first surface 3112, and the third surface 3114 disposed opposite to the first light exiting surface 3111a. The opposite ends of the third surface 3114 are directly connected to the first light exiting surface 3111 a and the first surface 3112.

The second sub-body 311b is disposed on a side of the first sub-body 311a close to the first reflector 32. The second sub-body 311b has the second light exiting surface 3111b, the first side surface 3113, and a second surface 3122 that is opposite to the first side surface 3113 and faces the first sub-body 311a. The first side surface 3113 is located on the side of the second sub-body 311b close to the first reflector 32. The opposite ends of the second light exiting surface 3111b is directly connected to the first side surface 3113 and the second surface 3122. The second side surface 3121 is located on the side of the protruding portion 312 close to the first reflector 32. The other end of the first side surface 3113 is directly connected to the second side surface 3121. The other end of the second side surface 3121 can also be directly connected to the bottom surface of the protruding portion 312. The protruding portion 312 is disposed under the second sub-body 311b, and may be integrally formed with the second sub-body 311b.

Specifically, the third surface 3114 of the first sub-body 311a and the second surface 3122 of the second sub-body 311b can be bonded by the same high-permeability fixing glue 315 as shown in FIG. 4. In this way, the loss of light amount in the process of entering the first sub-body 311a from the second sub-body 311b is reduced.

Further, the top of the second sub-body 311b is flush with the top of the first sub-body 311a. That is, the first light exiting surface 3111a of the first sub-body 311a and the second light exiting surface 3111b of the second sub-body 311b are on the same plane. The sum of the thickness of the second sub-body 311b and the protruding portion 312 is greater than the thickness of the first sub-body 311a. This causes the bottom of the protruding portion 312 to exceed the bottom of the first sub-body 311a. The light source 33 is disposed at the bottom of the first sub-body 311a. The part of the protruding portion 312 that extends beyond the first sub-body 311 a is away from the first reflector 32. A side surface of the protruding portion 312 that extends beyond the first sub-body 311a and facing the light source 33 is the light incident surface of the light guide 31.

Figure 6:
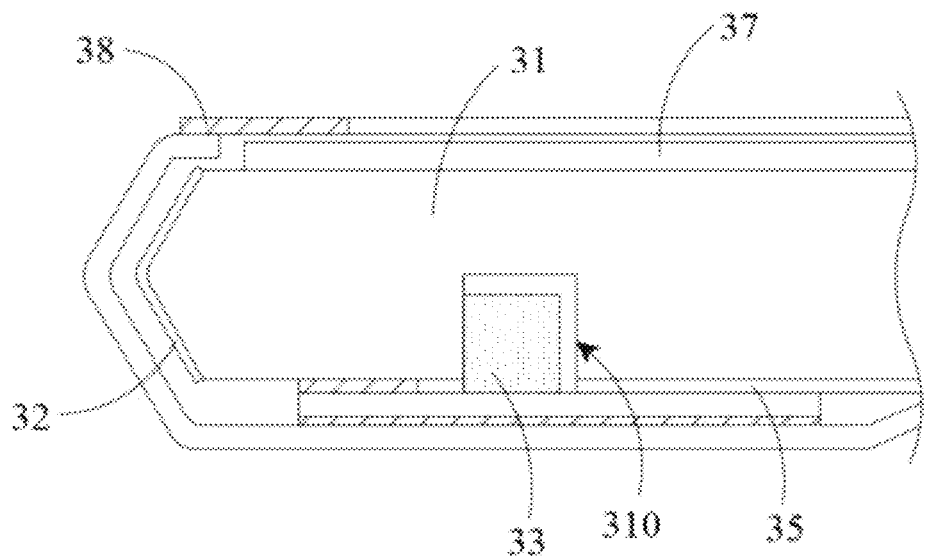
FIG. 6 is a schematic structural diagram of a fourth backlight module provided by an embodiment of the application.

In an embodiment, as shown in FIG. 6, FIG. 6 is a schematic structural diagram of a fourth backlight module provided by an embodiment of the application. The bottom of the light guide 31 may be a flat surface. The receiving cavity 310 may be disposed at the bottom of the light guide 31. The light incident surface 310 of the light guide 31 is the inner wall surface of the receiving cavity 310. The light source 33 is embedded in the receiving cavity 310. The second reflector 35 may be disposed at the bottom of the light guide 31. The light emitted by the light source 33 may be incident into the light guide 31 through the inner wall surface of the receiving cavity 310 in a direction toward the first reflector 32. The light is reflected back into the light guide 31 after passing through the first reflector 32, and continues to propagate within the light guide 31 to a far light source end under a reflection effect of the second reflector 35.

In the embodiment of the present application, the receiving cavity 310 may be integrally formed with the light guide 31. When the light guide 31 is formed by injection molding, the receiving cavity 310 can be formed at the bottom of the light guide 31 at the same time. In this way, the manufacturing process difficulty of the light guide 31 and the assembling difficulty of the light source 33 can be reduced. In addition, the light source 33 can also be embedded in the receiving cavity 310 at the bottom of the light guide 31. This omits the thickness of the backlight module 30 occupied by the light source 33, thereby reducing the thickness of the backlight module 30.

Further, the shape of the receiving cavity 310 is adapted to the shape of the light source 33. When the light source 33 is a point light source, the receiving cavity 310 may be a square groove. When the light source 33 is a linear light source, the receiving cavity 310 may be a long groove.

Furthermore, the backlight module 30 further includes a frame 36. The light guide 31 and the light source 33 are both arranged in the frame 36. The first reflector 32 is disposed on a side of the light guide 31 close to the frame.

The frame 36 includes a flat bottom frame 361 and a side frame 362 formed by extending the peripheral edges of the bottom frame 361 along the thickness direction of the bottom frame. The accommodating space enclosed by the bottom frame 361 and the side frame 362 is used for accommodating the light guide 31 and the light source 33.

In one of the embodiments, as shown in FIG. 3, the side frame 362 has a flat surface, and the side frame 362 and the bottom frame 361 are perpendicular to each other.

In one of the embodiments, as shown in FIG. 4, side frame 362 of the frame 36 close to the protruding portion protrudes outward to form a wedge-shaped structure adapted to the first side surface 3113 and the second side surface 3121. The end of the main body portion 311 close to the side frame 362 and the protruding portion 312 at least partially extend into the wedge-shaped structure.

Furthermore, the backlight module 30 further includes a light shielding glue 38. The light shielding glue 38 may be disposed on the side of an optical film 37 away from the light guide 31 and cover the area of the backlight module 30 corresponding to a non-display area of the main body of the display panel. This is used to shield the light guide 31, the first reflector 32, the light source 33, and other components in the backlight module 30, so as to avoid light leakage of the backlight module 30 in an area of the lamp socket.

A part of the light shielding glue 38 can be attached to the top of the side frame 362. An orthographic projection portion of the light shielding glue 38 on the bottom frame 361 covers the end of the light guide 31 where the light source 33 is provided. By partially extending the light guide 31 into the wedge-shaped structure of the side frame 362, the area of the light guide 31 covered by the light shielding glue 38 can be increased, so that the width of the lamp socket of the backlight module can be reduced.

Figure 7:
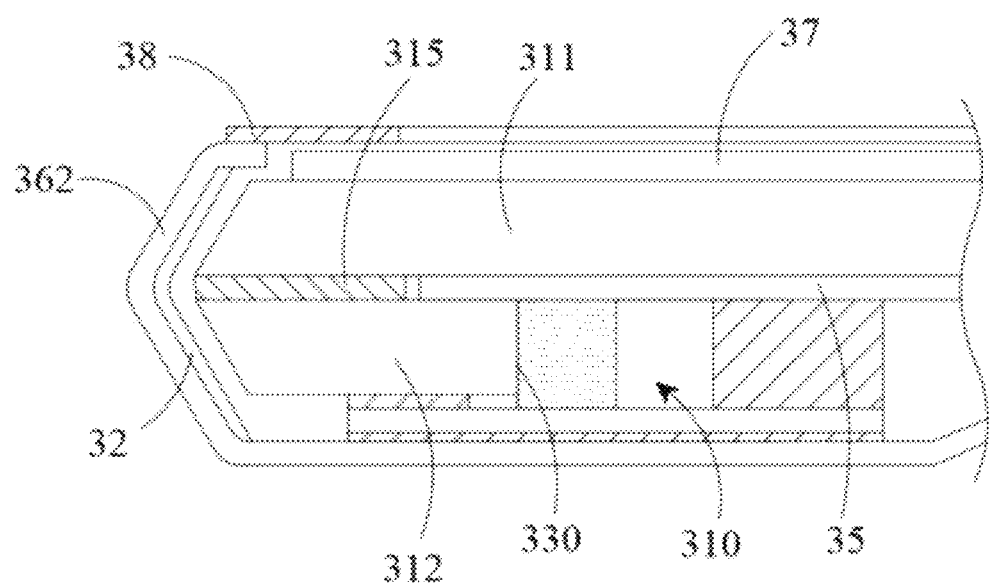
FIG. 7 is a schematic structural diagram of a fifth backlight module provided by an embodiment of the application.

In an embodiment, as shown in FIG. 7, FIG. 7 is a schematic structural diagram of a fifth backlight module provided by an embodiment of the application. It should be noted that the structure of the backlight module shown in FIG. 7 is substantially the same as the structure of the backlight module shown in FIG. 4. The difference is that in the fifth backlight module shown in FIG. 7, the first reflector 32 is disposed on the inner wall of the side frame 362 close to the light guide 31.

In the embodiment of the present application, the bottom frame 361 and the side frame 362 of the frame 36 may be integrally formed. In practical applications, the bottom frame 361 and the side frame 362 of the frame 36 can be two independent components. The fixed connection between the bottom frame 361 and the side frame 362 may include, but is not limited to, glue, snap-fit, or threaded connection.

In the embodiment of the present application, the material of the frame 36 is metal, so that the frame 36 can have good rigidity. This prevents the frame 36 from deforming when receiving an external force and causing damage to the internal components such as the light source 33 and the light guide 31.

In the backlight module shown in FIG. 7, the first reflector 32 may be a reflective coating. The reflective coating can be directly formed on the inner wall of the side frame close to the light guide 31 by spraying or evaporation. In practical applications, the first reflector 32 may also be a reflecting sheet or a reflecting plate made of metal or non-metal materials. The first reflector 32 can be attached to the inner wall of the side frame close to the light guide 31 by means of glue.

Further, in the embodiment of the present application, the backlight module 30 further includes an optical film 37, and the optical film 37 is disposed on the light exiting side of the light guide 31. The optical film 37 may include, but is not limited to, at least one of optical films such as a diffusion film, an incremental film, or a prism film.

Further, in the embodiment of the present application, as shown in FIG. 4, the backlight module 30 may further include a supporting layer 39. The supporting layer 39 is disposed on the flexible circuit board 34 and used to support the second reflector 35. The supporting layer 39 may be made of double-sided tape, foam tape or other soft rubber materials.

The embodiments of the application provide a backlight module, a display panel, and an electronic device. The electronic device includes the display panel. The display panel includes a display panel main body and a backlight module. The backlight module includes a light guide, a reflector, and a light source. The reflector is arranged on the side of the light guide. The reflective surface of the reflector faces the light guide. By arranging the light source at the bottom of the light guide, the light source and the light guide overlap in the thickness direction of the backlight module. In this way, the width of the lamp socket of the backlight module is reduced. The bottom of the light guide has a light incident surface. The light incident surface of the light guide faces the light emitting surface of the light source. The light emitting surface of the light source faces the reflective surface of the reflector. After the light emitted from the light source emerges from the bottom of the light guide, the light can be reflected back into the light guide through the reflective surface of the reflector. This makes the mixing distance of the backlight module unaffected. Therefore, while reducing the width of the lamp socket of the backlight module, the lamp socket of the backlight module can have a good light effect.

In summary, although the application is disclosed as above in preferred embodiments, the above-mentioned preferred embodiments are not intended to limit the application. Those of ordinary skill in the art can make various changes and modifications without departing from the spirit and scope of this application. Therefore, the protection scope of this application is based on the scope defined by the claims.

What is claimed is:

1. A backlight module, comprising:
   a light guide having a receiving cavity;
   a first reflector disposed on a side of the light guide, wherein a reflective surface of the first reflector faces the light guide; and
   a light source disposed in the receiving cavity, wherein a light emitting surface of the light source faces the reflective surface of the first reflector;
   wherein the light guide has a main body and a protruding portion disposed below the main body, and the main body and the protruding portion are enclosed to form the receiving cavity;
   wherein the main body comprises a light exiting surface and a first surface that are opposed to each other, the protruding portion and the light source are both disposed on a side of the first surface away from the light exiting surface, and the light source is disposed on a side of the protruding portion away from the first reflector; and
   wherein the light exiting surface comprises a first light exiting surface and a second light exiting surface that are on a same plane, and the main body comprises:
   a first sub-body comprising the first light exiting surface and a first surface opposite to the first light exiting surface; and
   a second sub-body located on a side of the first sub-body close to the first reflector, wherein the second sub-body has the second light exiting surface, the first side surface, and a second surface that is opposite to the first side surface and faces the first sub-body, opposite ends of the second light exiting surface are directly connected to the first side surface and the second surface, and the protruding portion is located below the second sub-body and is integrally formed with the second sub-body.

2. The backlight module according to claim 1, wherein opposite ends of the first side surface are directly connected to the light exiting surface and the first surface, and the protruding portion is fixedly connected to the first surface.

3. The backlight module according to claim 1, wherein the backlight module further comprises a frame, the light guide and the light source are both disposed in the frame, and the first reflector is disposed on a side of the light guide close to the frame.

4. The backlight module according to claim 3, wherein a side frame of the frame close to the protruding portion protrudes outward to form a wedge-shaped structure adapted to the first side surface and the second side surface, and an end of the main body close to the side frame and the protruding portion at least partially extend into the wedge-shaped structure.

5. The backlight module according to claim 1, wherein the first reflector comprises a first part parallel to the first side surface and a second part parallel to the second side surface.

6. The backlight module according to claim 1, wherein opposite ends of the first side surface are directly connected to the light exiting surface and the second side surface.

7. The backlight module according to claim 6, wherein the main body and the protruding portion are integrally formed.

8. The backlight module according to claim 1, wherein the light guide further comprises a second reflector, and the second reflector is disposed between the light source and the first surface.

9. The backlight module according to claim 1, wherein a width of a lamp socket of the backlight module only comprises an optical path and a distance between the frame and the light guide.

10. The backlight module according to claim 1, wherein the optical path is a light mixing distance of the backlight module, and a minimum value of the width of the lamp socket is less than 1 mm.

11. A display panel comprising a display panel main body and a backlight module, wherein the display panel main body is disposed on a light exiting side of the backlight module, and the backlight module comprises:
    a light guide having a receiving cavity;
    a first reflector disposed on a side of the light guide, wherein a reflective surface of the first reflector faces the light guide; and
    a light source disposed in the receiving cavity, wherein a light emitting surface of the light source faces the reflective surface of the first reflector;
    wherein the light guide has a main body and a protruding portion disposed below the main body, and the main body and the protruding portion are enclosed to form the receiving cavity;
    wherein the main body comprises a light exiting surface and a first surface that are opposed to each other, the protruding portion and the light source are both disposed on a side of the first surface away from the light exiting surface, and the light source is disposed on a side of the protruding portion away from the first reflector; and
    wherein the light exiting surface comprises a first light exiting surface and a second light exiting surface that are on a same plane, and the main body comprises:
    a first sub-body comprising the first light exiting surface and a first surface opposite to the first light exiting surface; and
    a second sub-body located on a side of the first sub-body close to the first reflector, wherein the second sub-body has the second light exiting surface, the first side surface, and a second surface that is opposite to the first side surface and faces the first sub-body, opposite ends of the second light exiting surface are directly connected to the first side surface and the second surface, and the protruding portion is located below the second sub-body and is integrally formed with the second sub-body.

12. The display panel according to claim 11, wherein opposite ends of the first side surface are directly connected to the light exiting surface and the first surface, and the protruding portion is fixedly connected to the first surface.

13. The display panel according to claim 11, wherein the backlight module further comprises a frame, the light guide and the light source are both disposed in the frame, and the first reflector is disposed on a side of the light guide close to the frame.

14. The display panel according to claim 13, wherein a side frame of the frame close to the protruding portion protrudes outward to form a wedge-shaped structure adapted to the first side surface and the second side surface, and an end of the main body close to the side frame and the protruding portion at least partially extend into the wedge-shaped structure.

15. The display panel according to claim 11, wherein the first reflector comprises a first part parallel to the first side surface and a second part parallel to the second side surface.

16. The display panel according to claim 11, wherein opposite ends of the first side surface are directly connected to the light exiting surface and the second side surface.

17. The display panel according to claim 16, wherein the main body and the protruding portion are integrally formed.

18. The display panel according to claim 11, wherein the light guide further comprises a second reflector, and the second reflector is disposed between the light source and the first surface.

19. The display panel according to claim 11, wherein a width of a lamp socket of the backlight module only comprises an optical path and a distance between the frame and the light guide.

20. The display panel according to claim 11, wherein the optical path is a light mixing distance of the backlight module, and a minimum value of the width of the lamp socket is less than 1 mm.

* * * * *